(12) United States Patent
Ralston

(10) Patent No.: US 9,851,941 B2
(45) Date of Patent: Dec. 26, 2017

(54) METHOD AND APPARATUS FOR HANDLING INCOMING DATA FRAMES

(71) Applicant: John Ralston, Glasgow (GB)

(72) Inventor: John Ralston, Glasgow (GB)

(73) Assignee: NXP USA, INC., Austin, TX (US)

( * ) Notice: Subject to any disclaimer, the term of this patent is extended or adjusted under 35 U.S.C. 154(b) by 780 days.

(21) Appl. No.: 14/307,864

(22) Filed: Jun. 18, 2014

(65) Prior Publication Data

US 2015/0370535 A1     Dec. 24, 2015

(51) Int. Cl.
*G06F 5/14* (2006.01)
*G06F 13/16* (2006.01)
*G06F 13/12* (2006.01)
*G06F 13/38* (2006.01)
*H04L 12/879* (2013.01)

(52) U.S. Cl.
CPC ............. *G06F 5/14* (2013.01); *G06F 13/128* (2013.01); *G06F 13/1673* (2013.01); *G06F 13/385* (2013.01); *H04L 49/901* (2013.01); *G06F 2205/064* (2013.01)

(58) Field of Classification Search
CPC .. G06F 2205/064; G06F 13/28; G06F 13/128; G06F 13/385; G06F 13/1673; G06F 5/14; H04L 49/901
See application file for complete search history.

(56) References Cited

U.S. PATENT DOCUMENTS

| 7,430,623 | B2 | 9/2008 | Walls et al. |
| 7,487,271 | B2 | 2/2009 | Khawand et al. |
| 2007/0073922 | A1* | 3/2007 | Go .......................... G06F 13/28 710/22 |

* cited by examiner

*Primary Examiner* — Ernest Unelus

(57) ABSTRACT

A method and apparatus for handling incoming data frames within a network interface controller. The network interface controller comprises at least one controller component operably coupled to at least one memory element. The at least one controller component is arranged to identify a next available buffer pointer from a pool of buffer pointers stored within a first area of memory within the at least one memory element, receive an indication that a start of a data frame has been received via a network interface, and allocate the identified next available buffer pointer to the data frame.

18 Claims, 10 Drawing Sheets

METHOD AND APPARATUS FOR HANDLING INCOMING DATA FRAMES

FIELD OF THE INVENTION

This invention relates to a method and apparatus for handling incoming data frames.

BACKGROUND OF THE INVENTION

In conventional Ethernet controller implementations, a buffer pointer that defines an address in memory where a received frame is to be stored is typically defined within a frame descriptor produced by software executing on, for example, a central processing core. Upon receipt of a datagram comprising a frame of data, the Ethernet controller obtains the next frame descriptor for the appropriate ingress descriptor queue comprising the buffer pointer for the received frame, and the frame is written to memory at the address defined by the buffer pointer. The frame descriptor is then added to the appropriate descriptor queue. Such an approach works sufficiently well for most applications when there is only a single ingress descriptor queue.

However, if there are multiple ingress descriptor queues, and the Ethernet controller is required to parse the received data frame to enable a specific ingress descriptor queue to be determined, it is necessary to wait until the entire data frame has been received before the appropriate descriptor queue can be determined. For example, a frame is not validated until the Cyclic Redundancy Check (CRC) has been performed, and frames that fail the CRC may be required to be assigned to a "default queue" for frames that fail the CRC. As a result, a complete received frame is required to be stored within the Ethernet controller before the appropriate ingress descriptor queue can be determined, and thus before the next frame descriptor therefor can be obtained comprising the buffer point defining an address in memory where the received frame is to be stored. Only then can the received frame be written to memory, and internal memory of the Ethernet controller freed up for subsequently received frames. As such, the internal memory of the Ethernet controller has to be such that there is enough space to store incoming frames while the current frame is transferred to its buffer(s).

This need to store complete received frames increases the internal memory requirements of the Ethernet controller, adding undesirable power consumption and cost to the Ethernet controller hardware.

SUMMARY OF THE INVENTION

The present invention provides a network interface controller, a signal processing system and a method of handling incoming data frames within a network interface controller as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
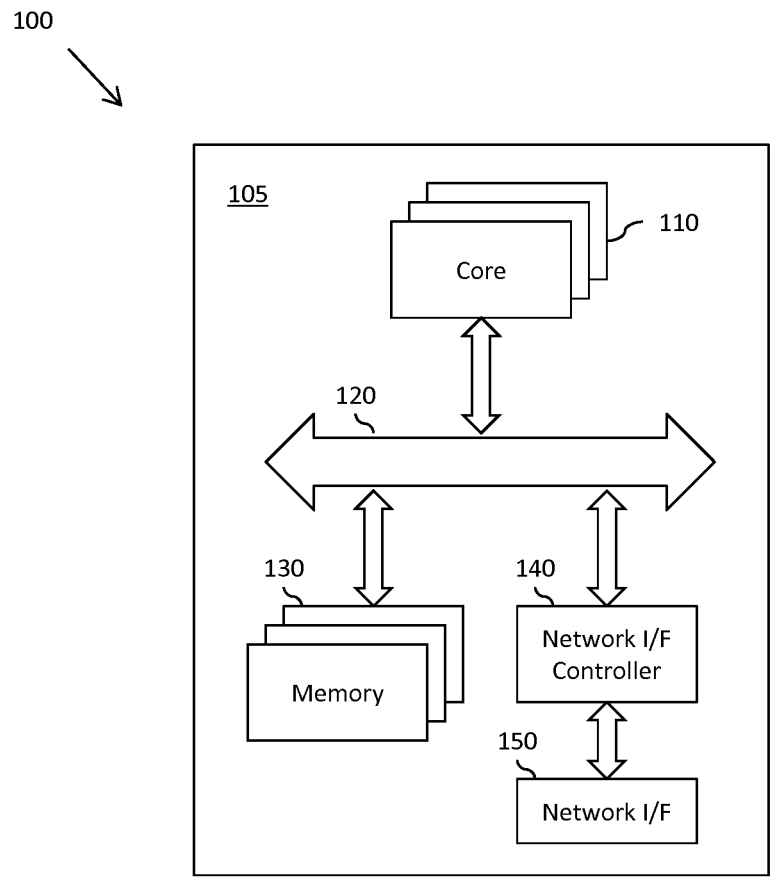
FIG. 1 illustrates a simplified block diagram of an example of signal processing system.

The present invention will now be described with reference to the accompanying drawings in which there is illustrated an example of a network interface controller and method therefor of handling incoming data frames. However, it will be appreciated that the present invention is not limited to the specific examples herein described and illustrated in the accompanying drawings. For example, the present invention has been illustrated and described primarily with reference to an Ethernet controller. However, it is contemplated that the present invention may equally be applied to alternative forms of network interface controllers. In particular, it is contemplated that the present invention may be applied to any forms of network interface controller that requires buffers, such as for example a CAN (Controller Area Network) controller, USB (Universal Serial Bus) controller, and more generally network interface controllers that use buffers to receive their output, etc.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of a first aspect of the present invention, there is provided a network interface controller comprising at least one controller component operably coupled to at least one memory element. The at least one controller component is arranged to identify a next available buffer pointer from a pool of buffer pointers stored within a first area of memory within the at least one memory element, receive an indication that a start of a data frame has been received via a network interface, and allocate the identified next available buffer pointer to the data frame.

In this manner, the network interface controller is arranged to perform the action of identifying which buffer pointer in the pool of buffer pointers is the next available buffer pointer to be used and allocate the identified buffer pointer to a data frame being received. This enables the network interface controller to manager the use of (defined) buffer pointers, thereby enabling a buffer pointer to be obtained earlier (e.g., without having to wait until the entire frame has been received), and freeing up core software from having to perform this function.

In some optional embodiments, the at least one controller component may be arranged to identify a next available buffer pointer based at least partly on availability check bits for buffer pointer entries within the pool of buffer pointers.

In some optional embodiments, the at least one controller component may be arranged to search buffer pointer entries within the pool of buffer pointers stored within the first area of memory for a buffer pointer entry comprising an availability check bit indicating the corresponding buffer pointer as being available, and identify as the next available buffer pointer a buffer pointer from a buffer pointer entry comprising an availability check bit indicating the corresponding buffer pointer as being available.

In some optional embodiments, the at least one controller component may be arranged to update the availability check bit for the buffer pointer entry of the identified next available buffer pointer to indicate the corresponding buffer pointer as being unavailable, upon allocation of the identified next available buffer pointer to the data frame.

In some optional embodiments, the at least one controller component may be arranged to identify a subsequent next available buffer pointer from the pool of buffer pointers upon allocation of the present identified next available buffer pointer to the data frame.

In some optional embodiments, the at least one controller component may be arranged to load the identified next available buffer pointer into a buffer pointer register in advance of receiving an indication of the receipt of a start of a data frame to be stored in a buffer to which the buffer pointer loaded into the register relates.

In some optional embodiments, the buffer pointer register may be arranged to further have stored therein an indication of a size of the pool of buffer pointers.

In some optional embodiments, the buffer pointer register may be arranged to further have stored therein an indication of a location of the pool of buffer pointers within the first area of memory.

In some optional embodiments, the at least one controller component may be further arranged to generate a frame descriptor for the data frame being received, the frame descriptor comprising at least the identified next available buffer pointer allocated to the data frame, and enqueue the frame descriptor within a frame descriptor queue within a second area of memory of the at least one memory element.

In some optional embodiments, the network interface may comprise at least one queue selection component arranged to select a frame descriptor queue within which to enqueue the frame descriptor for the data frame being received from a plurality of frame descriptor queues.

In some optional embodiments, the at least one queue selection component may be arranged to compare a pattern for the data frame being received to a pattern for each of at least a sub-set of the plurality of frame descriptor queues, and to select a frame descriptor queue within which to enqueue the frame descriptor for the data frame being received based at least partly on said comparison.

In some optional embodiments, the network interface controller may comprise a descriptor queue register corresponding to each of at least the sub-set of the plurality of frame descriptor queues, each descriptor queue register having stored therein at least the pattern for the respective frame descriptor queue.

In some optional embodiments, each descriptor queue register may further have stored therein a descriptor queue pointer for the respective frame descriptor queue, and the at least one controller component is arranged to enqueue the frame descriptor within the selected frame descriptor queue in accordance with the descriptor queue pointer stored within the descriptor queue register corresponding to the selected frame descriptor queue.

In some optional embodiments, the at least one controller component may be arranged to update the descriptor queue pointer stored within the descriptor queue register corresponding to the selected frame descriptor queue upon the frame descriptor for the data frame being enqueued therein.

In some optional embodiments, each descriptor queue register may be arranged to further have stored therein an indication of a size of the frame descriptor queue.

In some optional embodiments, each descriptor queue register may be arranged to further have stored therein an indication of a location of the frame descriptor queue within the second area of memory.

In some optional embodiments, the at least one controller component may be arranged to generate the frame descriptor for the data frame being received, the frame descriptor further comprising at least one of:
 a timestamp value corresponding to the receipt of the start of the data frame being received;
 a byte count for the data frame being received;
 a flag indicating this is the last frame descriptor linked to a received frame; and
 a cyclic redundancy check result for the data frame being received.

In some optional embodiments, the network interface controller may be implemented within an integrated circuit device comprising at least one die within a single integrated circuit package.

According to some examples of a second aspect of the present invention, there is provided a signal processing system comprising at least one network interface controller according to the first aspect of the present invention.

According to some examples of a third aspect of the present invention, there is provided a method of handling incoming data frames within a network interface controller. The method comprises, within a controller component of the network interface controller, identifying a next available buffer pointer from a pool of buffer pointers stored within a first area of memory within at least one memory element operably coupled to the network interface controller, receiving an indication that a start of a data frame has been received via a network interface, and allocating the identified next available buffer pointer to the data frame.

Referring first to FIG. 1, there is illustrated a simplified block diagram of an example of signal processing system 100. In the illustrated example, the signal processing system 100 is implemented within an integrated circuit device 105 comprising at least one die within a single integrated circuit package, and comprises one or more processing cores 110. The signal processing system 100 further comprises at least one interconnect component 120, for example comprising a bus, crossover switch, etc. arranged to operably couple the processing core(s) 110 to various other components within the signal processing system, such as one or more memory elements 130. The signal processing system 100 illustrated in FIG. 1 further comprises at least one network interface controller 140 arranged to operably couple the signal processing system to one or more external networks via a network interface 150. In some examples, such a network interface controller 140 may comprise an Ethernet controller or the like. In some alternative examples, the network interface controller 140 may comprise, say, a CAN (Controller Area Network) controller, USB (Universal Serial Bus) controller, etc.

Figure 2:
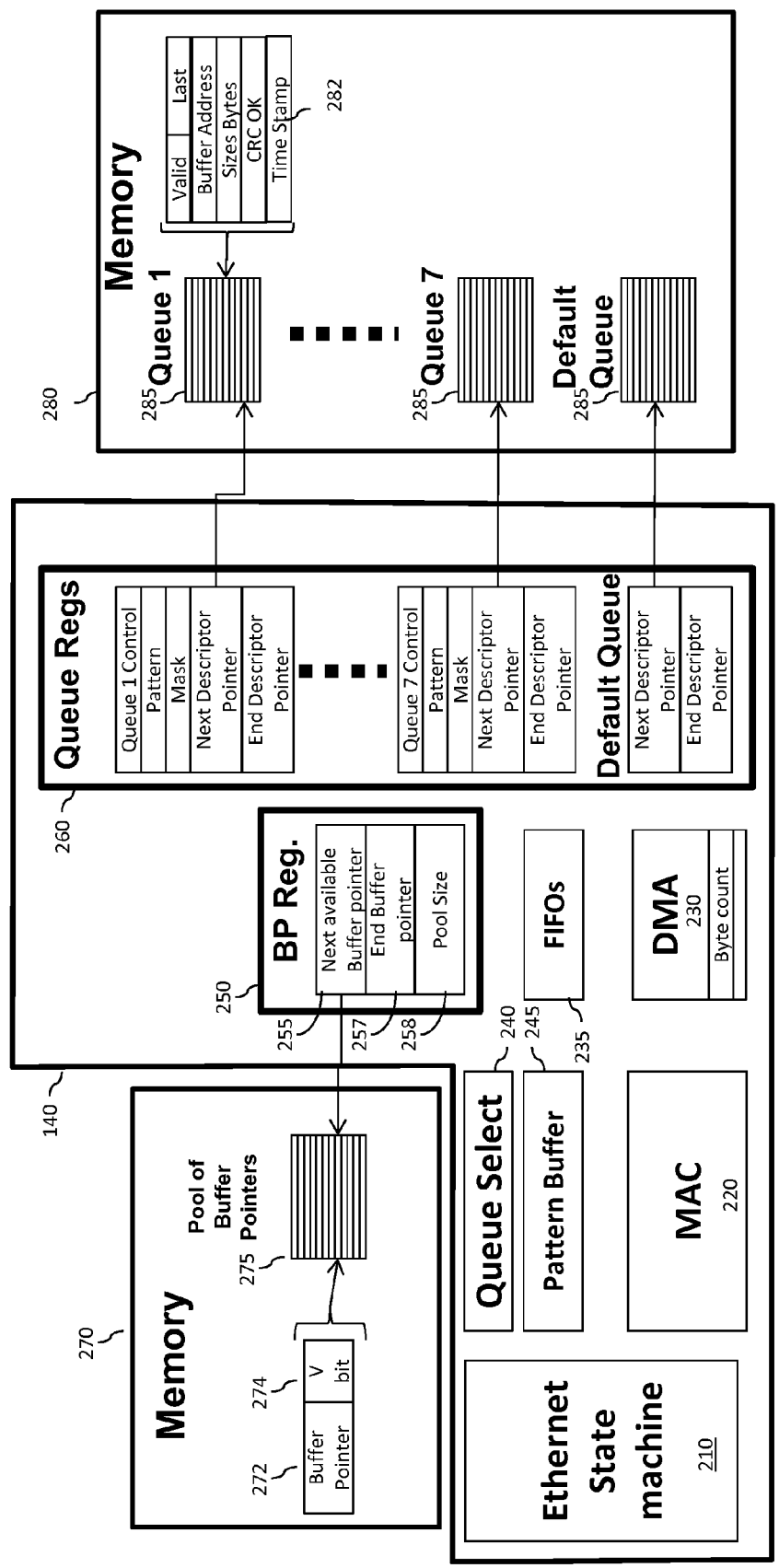
FIG. 2 illustrates a simplified block diagram of an example of a network interface controller.

Referring now to FIG. 2, there is illustrated a simplified block diagram of an example of a network interface controller, such as may be used to implement the network interface controller 140 of FIG. 1, which in the illustrated example comprises an Ethernet controller. It will be appreciated that only those components of the network interface controller 140 necessary for the understanding of the present invention have been illustrated and described herein in order not to obfuscate the disclosure. The network interface controller 140 comprises various hardware functional blocks, for instance a controller component such as the Ethernet state machine 210, a media access controller (MAC) component 220, a direct memory access (DMA) component 230 and a queue selection component 240. In the illustrated example, the network interface controller 140 further comprises various internal memory elements, for instance a pattern buffer 245 and first-in-first-out (FIFO) buffers 235, and internal registers, for instance buffer pointer register 250 and descriptor queue registers 260.

The state machine 210 provides the core functionality of the network interface controller 140, and provides linkages between the various other hardware functional blocks and interfacing to the rest of the signal processing system 100.

The MAC component 220 provides Media Access Control (MAC) functionality, such as defined within the IEEE 802.3 specification. In particular, the MAC component 220 provides interfacing between the physical layer (provided by the network interface 150) and the digital layer, and identification of frames and cyclic redundancy check (CRC) validation. The MAC component 220 also informs the state machine 210 of frames being received and the state of the frame. The MAC component 220 is further arranged to stream a required part of a received frame into the pattern buffer 245, as well as streaming the received frame to the internal FIFO buffers 235. In the illustrated example the pattern buffer 245 and FIFO buffers 235 have been illustrated as being discrete from one another. However, in some alternative examples the pattern buffer 245 may be provided by one of the FIFO buffers 235.

The DMA component 230 performs transfers of data from internal memory such as the FIFO buffers 235 to system memory (e.g. with the memory element(s) 130 illustrated in FIG. 1) under control of the state machine 210.

As described in greater detail below, the queue selection component 240 is arranged to perform comparisons between the part of a received frame within the pattern buffer 245 and patterns (and masks) stored within the descriptor queue registers 260. In some examples the pattern and mask comparison performed by the queue selection component 140 may be more complex than a simple comparison with predefined patterns stored within the descriptor queue registers 260. For example, patterns and masks may be generated through controlling logical functions.

In the example illustrated in FIG. 2, the network interface controller is arranged to be operably coupled to a first area of system memory 270, for example within the memory element(s) 130 illustrated in FIG. 1. In some examples, this first area of memory 270 comprises generic memory accessible by the processing core(s) 110 and the hardware components of the network interface controller 140, and in the illustrated example of the present invention contains a series of descriptors 275 which contain buffer pointers. As such, a pool of buffer pointers is stored (within the series of descriptors 275) within the first area of memory 270. The series of descriptors 275 containing the pool of buffer pointers may comprise any suitable form or structure, such as a linked list or a cyclic descriptor ring. In some examples, the descriptors 275 may be populated with buffer pointers by software executing on the processing core(s) 110. In the illustrated example, the descriptors 275 are arranged within a cyclic ring, with each descriptor 275 comprising a buffer pointer 272 and an availability check bit 274. Software executing on the processing core(s) 110 may also store the location of the descriptors 275 within memory 130 and other valid information pertaining to the location and status of the descriptors 275 and the buffers that they point to within the buffer pointer register 250.

In the example illustrated in FIG. 2, the network interface controller is further arranged to be operably coupled to a second area of system memory 280, for example within the memory element(s) 130 illustrated in FIG. 1. The second area of memory 280 may be located within the same physical memory element as the first area of memory 270, or may be located within a different physical memory element. In some examples, this second area of memory 280 also comprises generic memory accessible by the processing core(s) 110 and the hardware components of the network interface controller 140, and contains frame descriptor queues 285 in which descriptors 282 for received data frames are maintained. These frame descriptor queues 285 may comprise any suitable form or structure, such as a linked list or a cyclic descriptor ring. Software executing on the processing core(s) 110 may also store the relevant information concerning these frame descriptor queues 285 within the descriptor queue registers 260. Such information may comprise, for example, pattern and mask information for the respective frame descriptor queue 285 to which the relevant part of a received frame stored within the pattern buffer 245 may be compared by the queue selection component 240, a location of the respective frame descriptor queue 285 within the second area of memory 280, a next descriptor pointer for the respective frame descriptor queue 285, etc.

Figure 3:
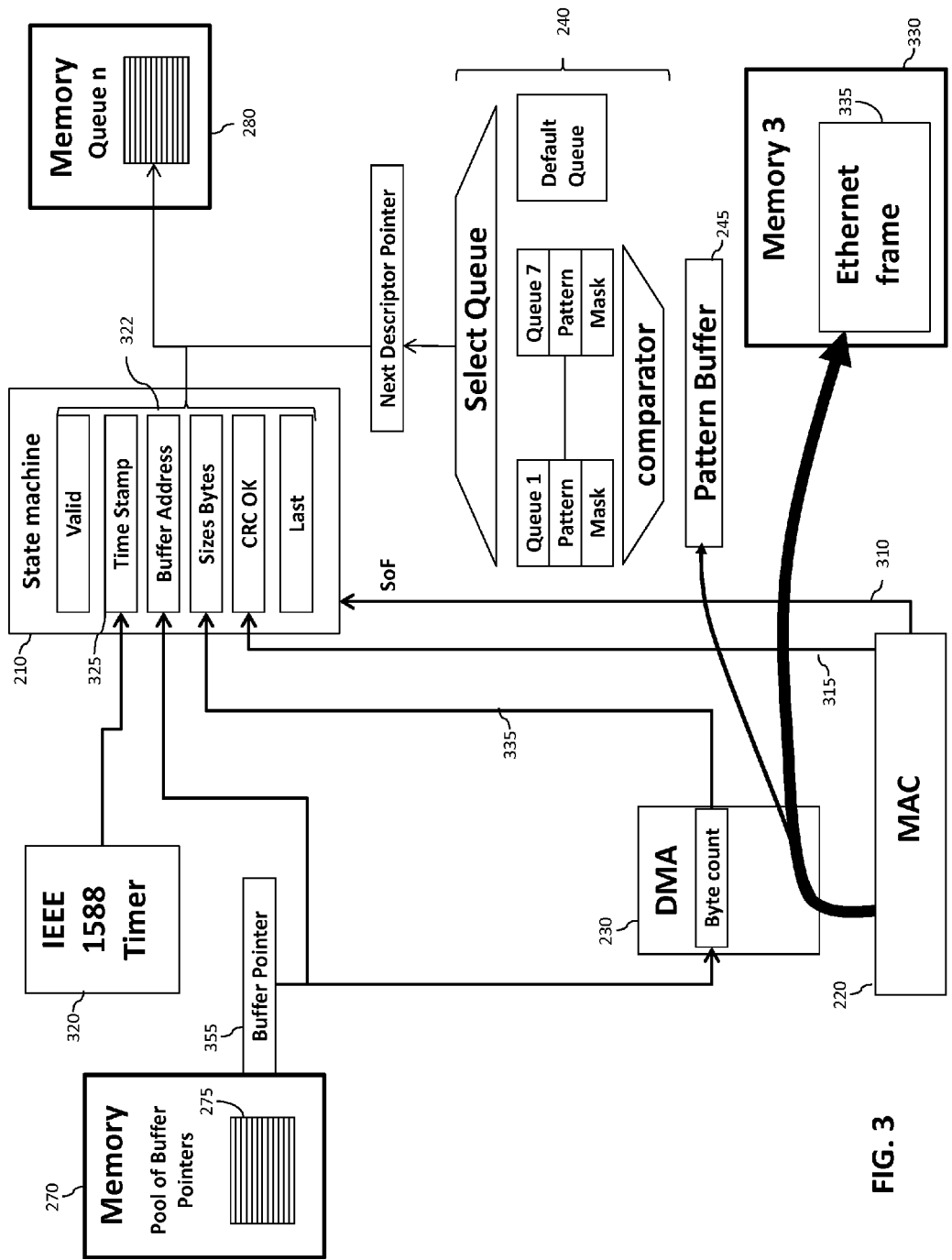
FIG. 3 illustrates a simplified block diagram illustrating an example of the ingress functionality performed within the network interface controller of FIG. 2.

FIG. 3 illustrates a simplified block diagram illustrating an example of the ingress functionality performed within the network interface controller 140 of FIG. 2. The state machine 210 is arranged to identify a next available buffer pointer 272 from the pool of buffer pointers stored within the series of descriptors 275 within the first area of memory 270. In the illustrated example, and as described in greater detail below with reference to FIG. 8, the state machine 210 is arranged to identify a next available buffer pointer 272 from the pool of buffer pointers based on the availability check bit 274 for the buffer pointer entries within series of descriptors 275. For example, the state machine 210 may be arranged to search buffer pointer descriptors 275 within the first area of memory 270 for a buffer pointer descriptor 275 comprising an availability check bit 274 indicating the respective buffer pointer 272 as being available. Upon finding a buffer pointer descriptor 275 comprising an availability check bit 274 indicating the respective buffer pointer 272 as being available, the state machine 210 identifies the respective buffer pointer 272 as the next available buffer pointer 272. The state machine 210 may then load the identified next available buffer pointer 272 into the buffer pointer register 250. In some examples, the state machine 210 may be arranged to load the identified next available buffer pointer 272 into the buffer pointer register 250 in advance of the buffer pointer being required for an incoming data frame.

Figure 4:
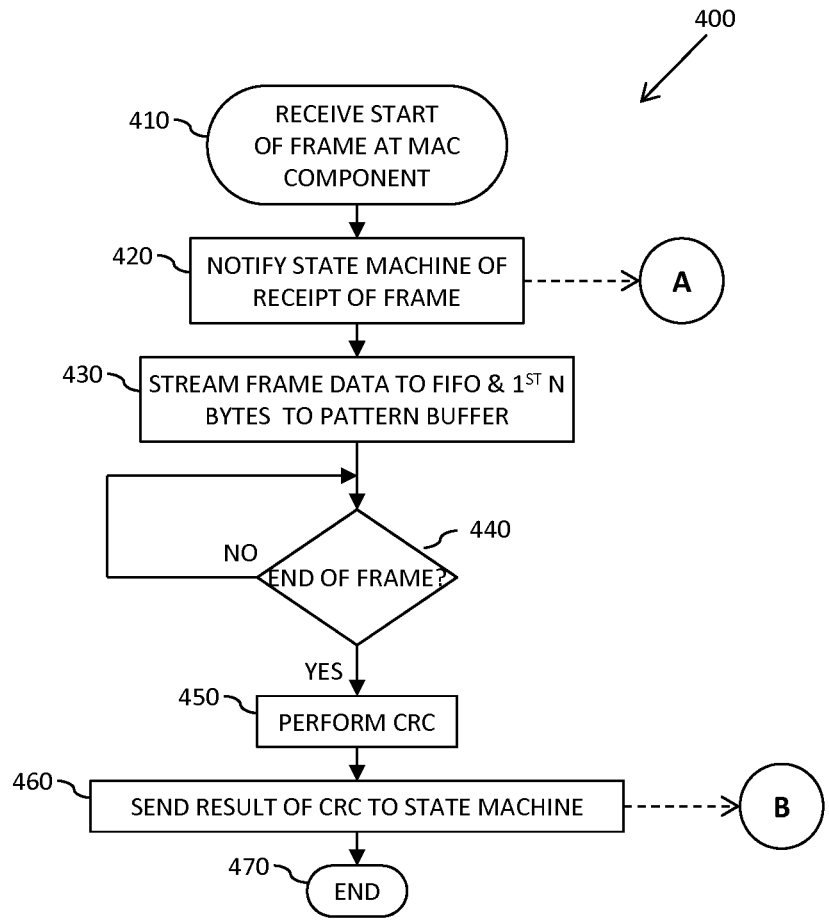
FIG. 4 illustrates a simplified flowchart of an example of a part of a method of handling incoming data frames.

FIG. 4 illustrates a simplified flowchart 400 of an example of a part of a method of handling incoming data frames, and in particular an example of a part of a method of handling incoming data frames performed within MAC component of a network interface controller such as the MAC component 220 of the Ethernet controller 140 of the example illustrated in FIGS. 1 and 2. In this illustrated example, this part of the method starts at 410 with the receipt of the start of an incoming data frame by the MAC component 220, for example via the network interface 150. Upon the receipt of the start of an incoming data frame, the MAC component 220 is arranged provide a notification 310 (FIG. 3) of the receipt of the start of a data frame to, in the illustrated example, the state machine 210. Next, at 430, the MAC component 220 begins to stream the data frame being received to the internal FIFO buffers 235, and the required part (e.g. the first N bytes) of the data frame being received into the pattern buffer 245. The MAC component 220 continues to stream the frame data for the data frame being received until the end of frame has been received and streamed to the FIFO buffers 235, at 440. Upon receipt of the end of the data frame, the MAC component 220 performs, in the illustrated example, a cyclic redundancy check (CRC) on the received data frame, and provides the result of the CRC 315 (FIG. 3) to the state machine 210, at 460. This part of the method then ends, at 470.

Figure 5:
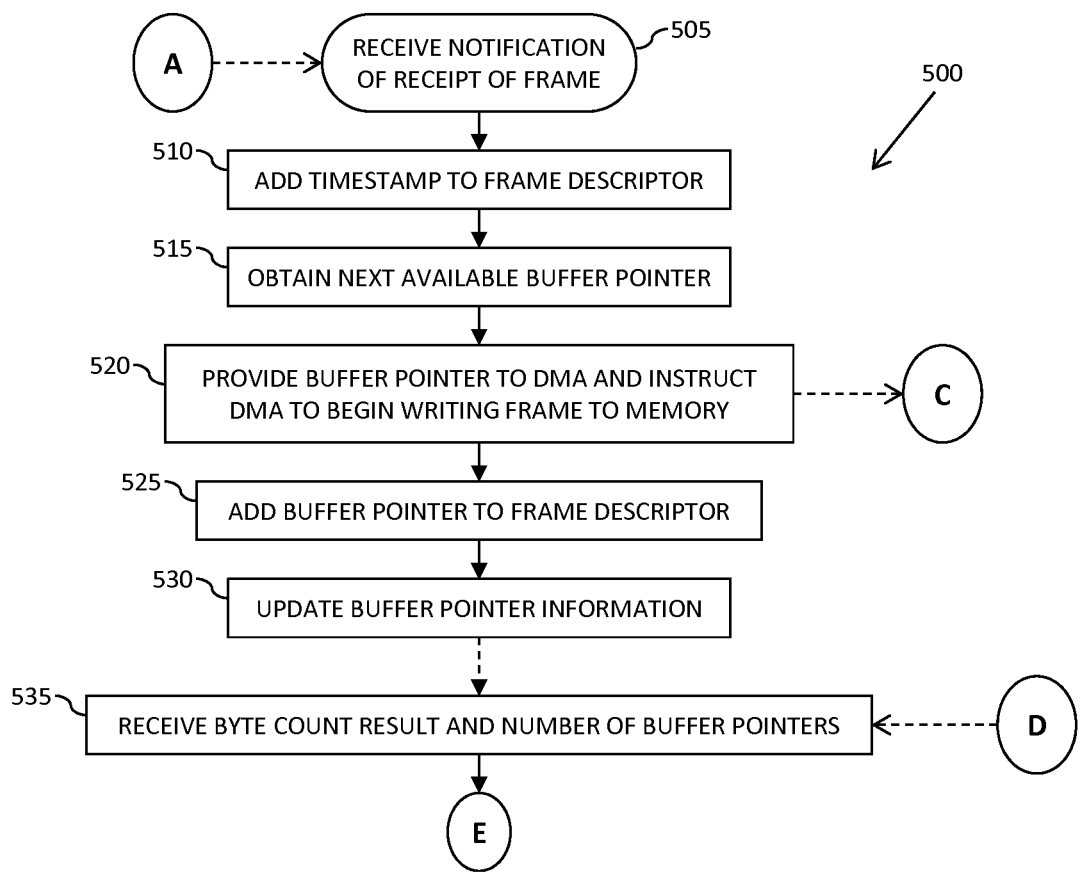
FIGS. 5 and 6 illustrate simplified flowcharts of an example of a further part of a method of handling incoming data frames.
Figure 6:
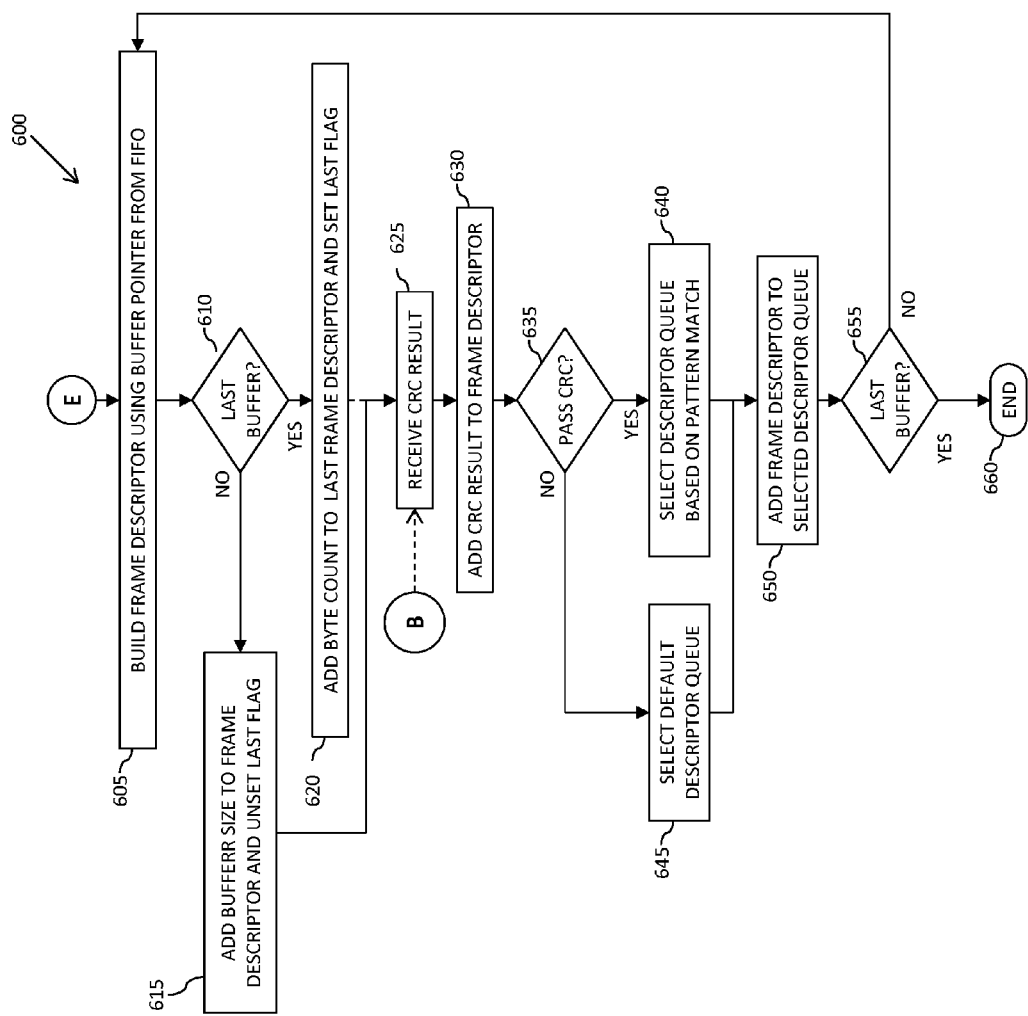

FIGS. 5 and 6 illustrate simplified flowcharts 500, 600 of an example of a further part of a method of handling incoming data frames, and in particular an example of a part of a method of handling incoming data frames performed within a controller component of a network interface controller such as the state machine 210 of the Ethernet controller 140 of the example illustrated in FIGS. 1 and 2. In this illustrated example, this part of the method starts at 505 with the receipt of a notification 310 (FIG. 3) of the receipt of the start of a data frame from, in the illustrated example, the MAC component 220. Upon receipt of such a notification, a time of arrival of the start of the frame is recorded and added to a frame descriptor for the data frame being received, at 510. In the illustrated example the time of arrival is recorded by way of a timestamp value 325 generated by an IEEE 1588 timer 320. A next available buffer pointer is then obtained and allocated to the data frame being received, at 515. In the example illustrated in FIG. 2 the next available buffer pointer may have previously been identified (for example as described in greater detail below) and an indication 255 thereof stored within the buffer pointer register 250. For example, an end buffer pointer 257 may be stored within the buffer pointer register 250 comprising an address within the first area of memory 170 at which a first or last buffer pointer descriptor 275 within the series of descriptors 275 is located. As such, the indication 255 of the next available buffer pointer may comprise, for example, an offset value which when applied to the end buffer pointer 257 within the buffer pointer register 250 provides an address in the first area of memory 270 at which the descriptor 275 for the next available buffer pointer is located. In this manner, the next available buffer pointer may be obtained from the pool of buffer pointers as defined within the buffer pointer register 250. The next available buffer pointer is then provided to the DMA component 230, and the DMA component 230 is instructed to begin writing the data frame being received from the FIFO buffers 235 to a buffer 335 within a third area of memory (FIG. 3) to which the next available buffer pointer relates. The third area of memory 330 may be located within the same physical memory element as the first and/or second area(s) of memory 270, 280, or may be located within a different physical memory element. In some examples, this third area of memory 330 also comprises generic memory accessible by the processing core(s) 110 and the hardware components of the network interface controller 140.

Figure 7:
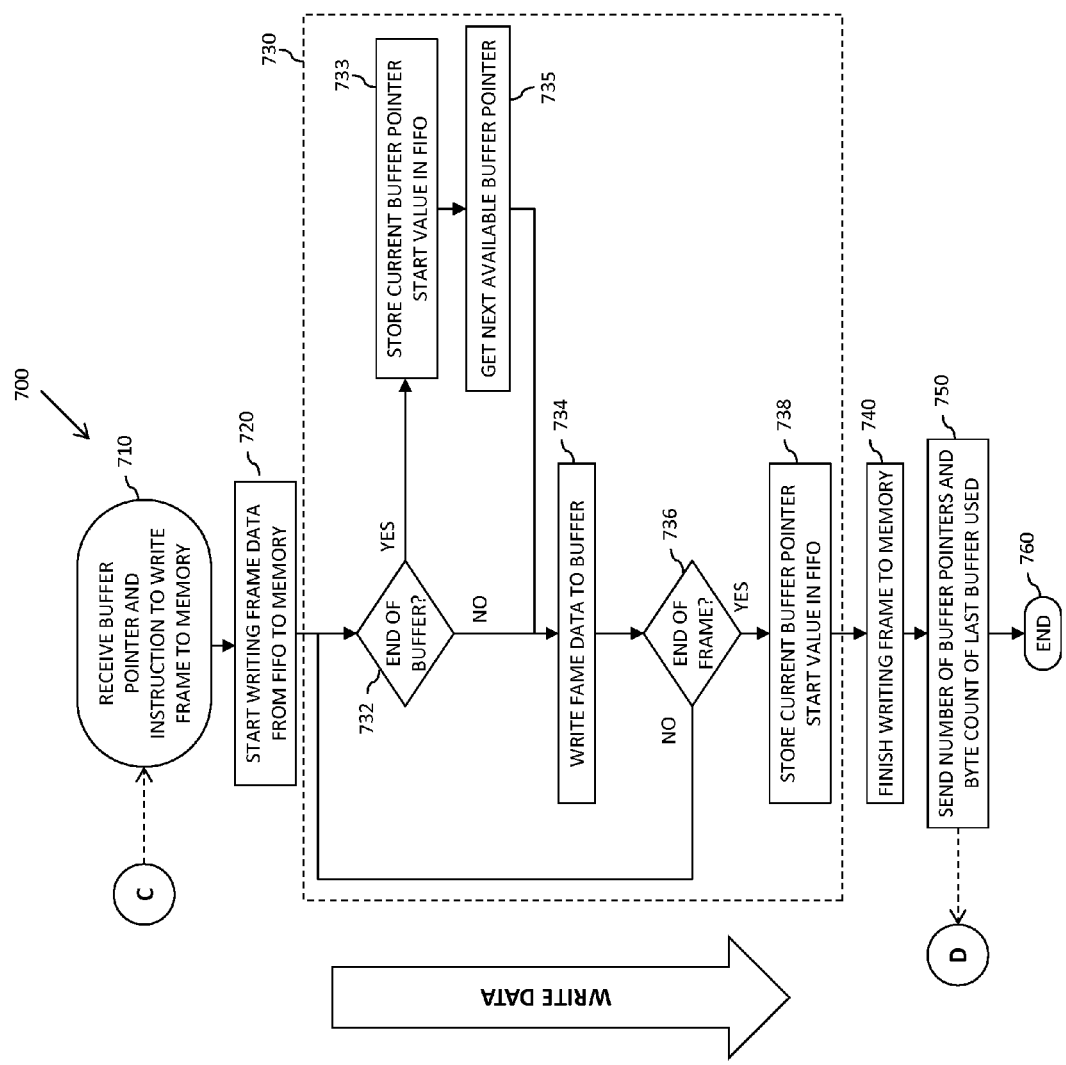
FIG. 7 illustrates a simplified flowchart of an example of the writing of a data frame to memory.

FIG. 7 illustrates a simplified flowchart 700 of an example of the writing of a data frame to memory by the DMA component 230. In the illustrated example, the method starts at 710 with the receipt of a buffer pointer and an instruction from the state machine 210 to write a data frame within the FIFO buffers 235 to memory. Upon receipt of the buffer pointer and instruction, the method moves on to 720, wherein the DMA component 720 starts to transfer frame data from the FIFO buffers 235 to the third area of memory 330, and continues to transfer the frame data, at 730 as it is being streamed into the FIFO buffers 235 by the MAC component 220. The size of memory area for a single buffer pointed to by a buffer pointer may be smaller than the complete data frame being written to the buffer. Accordingly, to accommodate for cases where the buffer area is smaller than the data frame being received, more than one buffer may be used. Accordingly, in the illustrated example of FIG. 7 the method comprises determining whether the end of the current buffer to which the frame data is being written has been reached, at 732. If it is determined that the end of the buffer has not been reached, the method moves on to 734 where a block of frame data is written from the FIFO buffers 235 to the third area of memory 330. It is then determined whether the end of the complete data frame has been reached and written to memory. If it is determined that the end of the data frame has not been reached, the method loops back to 732 where again it is determined whether the end of the buffer has been reached. If it is determined that the end of the buffer has been reached at 732, in the illustrated example the method moves on to 733 where a start value for the current buffer pointer is stored within a buffer pointer FIFO 322 (FIG. 3), and a next available buffer pointer is obtained at 735. For example, DMA component 230 may flag the state machine 210 that a next available buffer pointer is required, and in response the state machine 210 may obtain the next available buffer pointer and provide it to the DMA component 230. The method then moves on to 734 where a block of frame data is written to a new buffer to which the obtained next available buffer pointer relates. Once the end of the data frame has been reached, at 736, and a start value for the current buffer pointer is stored within the buffer pointer FIFO 322 at 738. Upon finishing the transfer of the data frame from the FIFO buffer 235 to the third area of memory 330, at 740, the DMA component sends the number of buffer pointers used and a byte count 335 (FIG. 3) for the last buffer used to the state machine 210, at 750. The method then ends, at 760.

In this manner, the DMA component 230 may begin writing the data frame being received to memory before the complete data frame has been received, thereby reducing the amount of memory space required to be available within the FIFO buffers 235 for storing frame data. Thus, the transfer of data from internal memory such as the FIFO buffers 235 to system memory (e.g. with the third area of memory 330) can happen while the data frame is being received by the MAC component 220 (and streamed into the FIFO buffers 235). The reason this is able to occur at the same time is that the buffer pointer(s) that the state machine 210 uses to initiate the DMA transfer is/are not linked to a queue descriptor, as is conventionally the case. It is worth noting that as the buffer size of the buffers associated with the buffer pointers could be less that the frame being written to memory 330, then multiple buffers may be required for storing the data frame and thus multiple buffer pointers may be required to be obtained.

Figure 8:
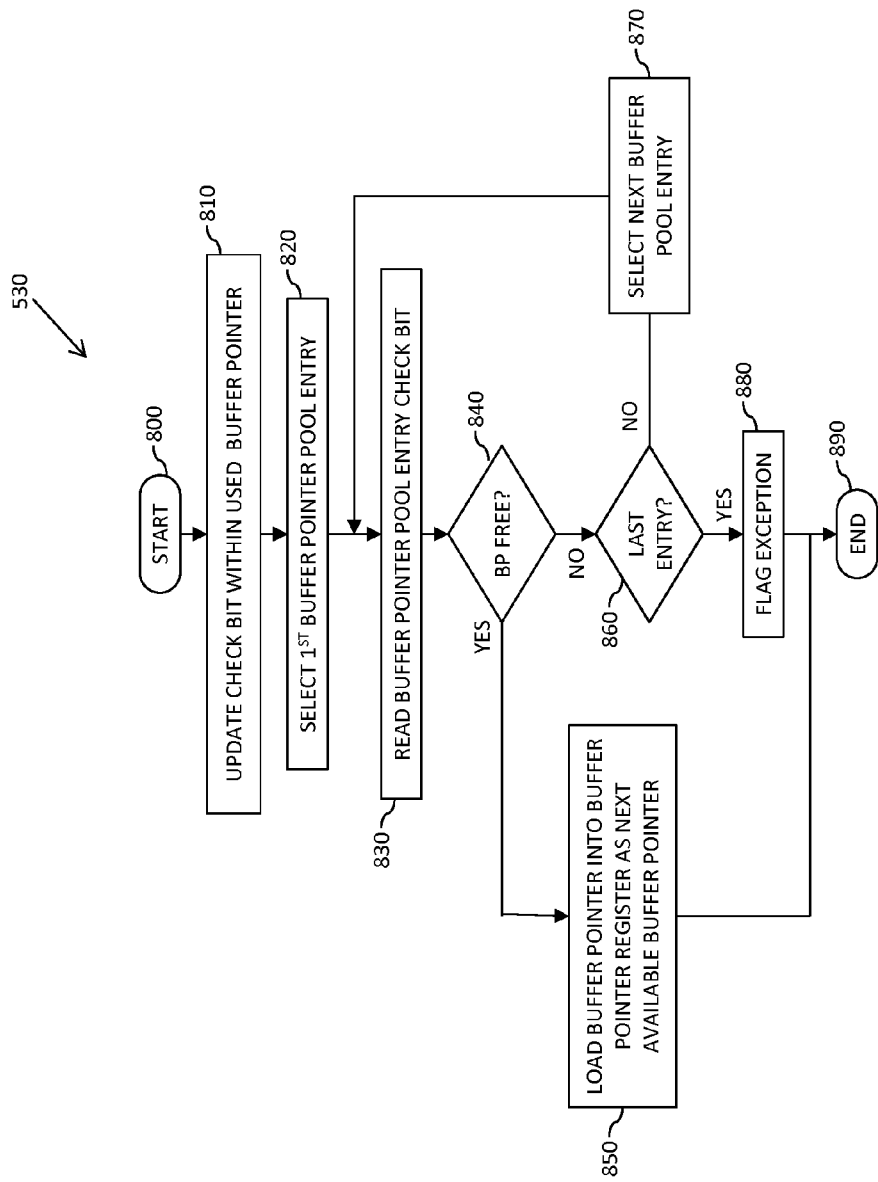
FIG. 8 illustrates a simplified flowchart of an example of updating buffer pointer information.

Referring back to the method of FIG. 5, having provided the obtained buffer pointer to the DMA component 230, and instructed the DMA component 230 to begin writing the data frame to memory 330, the obtained buffer pointer is added to the frame descriptor for the data frame being received. In the illustrated example, buffer pointer information is then updated at 530. FIG. 8 illustrates a simplified flowchart of an example of such updating of the buffer pointer information. This part of the method starts at 800, and moves on to 810 where the availability check bit 274 within the descriptor 275 in the first area of memory 270 for the last used buffer pointer (the 'next available buffer pointer' 275 in the buffer pointer register 250 in the example illustrated in FIG. 2) is updated to indicate that buffer pointer as now being unavailable. In this manner, as a buffer pointer is used the descriptor 275 therefor in the first area of memory 270 is updated to show that it has been used. Thus, the state machine 210 is arranged to update the availability check bit 274 for the buffer pointer entry of the identified next available buffer pointer to indicate the corresponding buffer pointer as being unavailable, after allocation of the buffer pointer to a data frame.

The method then moves on to 820 where a first buffer pointer pool entry (e.g., a first descriptor 275 in the illustrated example of FIG. 2) is selected. For example, the end buffer pointer 257 stored within the buffer pointer register 250 may comprise an address at which a first buffer pointer descriptor 275 is located. Alternatively, if the end buffer pointer 257 stored within the buffer pointer register 250 comprises an address at which a last buffer pointer descriptor 275 is located, the buffer pointer register 250 may further have stored therein a buffer pointer pool size indication 258 enabling the state machine 210 to 'count back' from the location of the last buffer pointer descriptor 275.

The availability check bit 274 for the selected buffer pointer pool entry (descriptor 275) is then read, at 830. If the availability check bit 274 for the selected buffer pointer pool entry indicates that the buffer pointer is free (e.g., has not previously been used without subsequently being freed up), at 840, the method moves on to 850 where the buffer pointer for the selected buffer pointer pool entry is loaded into the buffer pointer register 250 as the next available buffer pointer, and the method ends. In this manner, the state machine 210 is arranged to identify a subsequent 'next available buffer pointer' from the pool of buffer pointers after allocating a previously identified available buffer pointer to a data frame.

Referring back to 840, if the availability check bit 274 for the selected buffer pointer pool entry indicates that the buffer pointer is not free, the method moves on to 860 where it is determined whether the selected buffer pointer pool entry is the last entry in the buffer pointer pool. If the selected buffer pointer pool entry is not the last entry in the pool, the method moves on to 870 where the next buffer pointer pool entry is selected, and the method loops back to 830. Conversely, if the selected buffer pointer pool entry is the last entry in the buffer pointer pool, the method moves on to 880 where an exception is flagged to the processing core(s) 110, and the method ends at 890. In this manner, if no valid (i.e. free) buffer pointer pool entries are available, the state machine 210 is arranged to flag an exception to the processing core(s) 110 with the relevant information pertaining to the exception.

Referring back to FIG. 5, upon receipt of a byte count 335 (FIG. 3) last buffer used and the number of buffer pointers used from the DMA component 230, at 535, the method moves on to 605 (FIG. 6) where the buffer pointer from the top of the buffer pointer FIFO 322 is placed into the frame descriptor for the current data frame. The state machine 210 then checks at 610 to determine whether this buffer pointer points to the last frame buffer used to store this current data frame. If it is determined that this buffer pointer does not point to the last frame buffer, the method moves on to 615 where the buffer size is added to the frame descriptor for the byte count and the LAST flag in the frame descriptor is unset. Conversely, if it is determined that this buffer pointer does not point to the last frame buffer, the method moves on to 620 where the received byte count 335 is added to the frame descriptor and the LAST flag is set. Similarly, upon receipt of a CRC result 315 (FIG. 3) from the MAC component 220, at 625, the method moves on to 630 where the state machine 210 adds the received CRC result 315 to the frame descriptor. In the illustrated example, the CRC result 315 is then checked to determine whether the CRC for the received data frame was successful, at 635. If the CRC was successful, the method moves on to 640 where a frame descriptor queue for the data frame descriptor is selected based on a pattern match between a pattern within the pattern buffer 245 and a descriptor queue pattern, for example as determined by the queue selection component 240.

Figure 9:
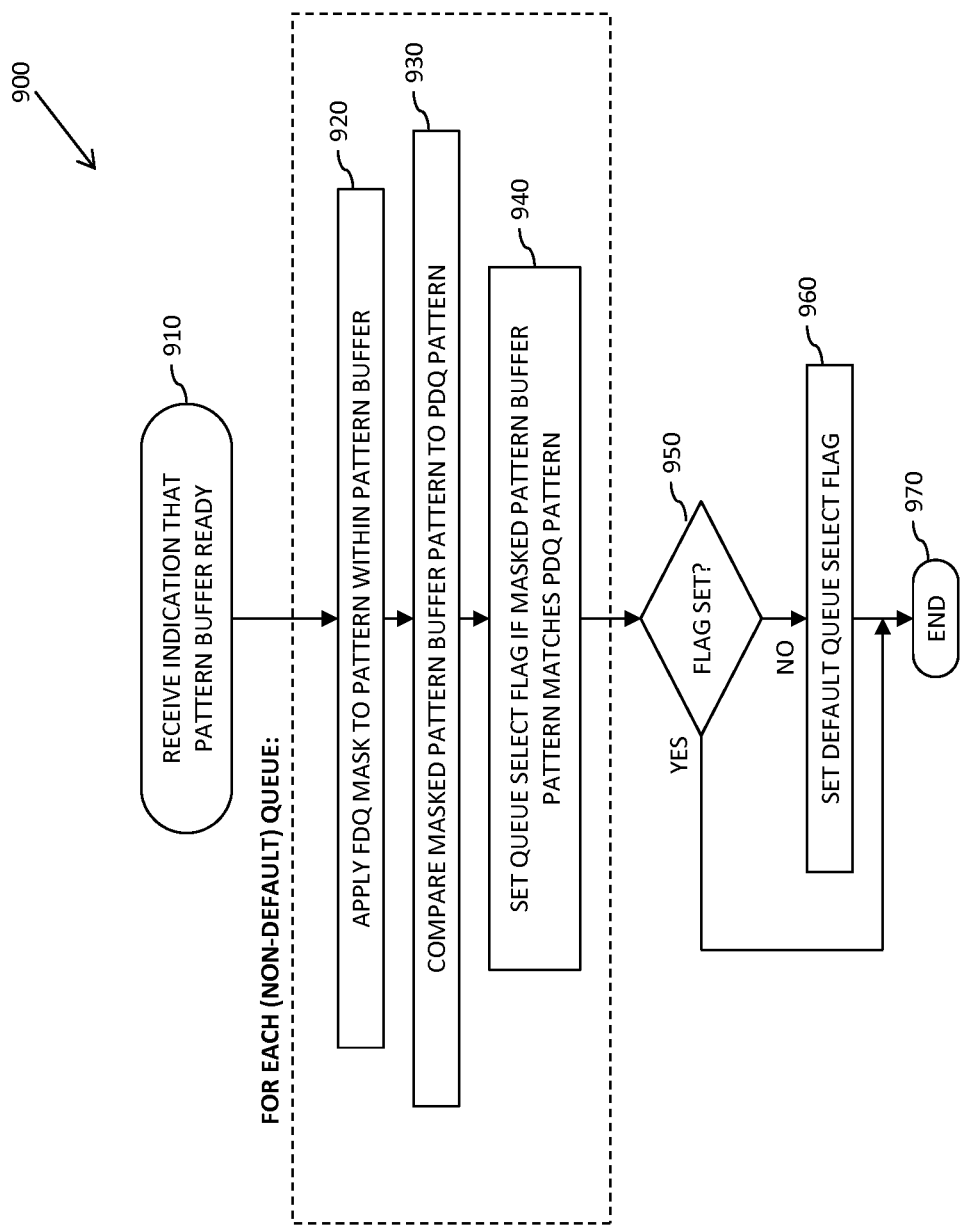
FIG. 9 illustrates a simplified flowchart of an example of determining a match between a pattern within a pattern buffer and a descriptor queue pattern.

FIG. 9 illustrates a simplified flowchart 900 of an example of determining such a match between a pattern within the pattern buffer 245 and a descriptor queue pattern, such as may be implemented by the queue selection component 240. The method starts at 910 with the receipt of an indication that the pattern buffer 245 is 'ready' (e.g., an indication that the required amount of bytes has been transferred (streamed) to the pattern buffer 245). For example, such an indication (not illustrated) may be provided to the queue selection component 240 directly from the MAC component 220. Upon receipt of such an indication, the method moves on and, in the illustrated example, for each non-default frame descriptor queue the queue selection component 240: applies a mask for the respective frame descriptor queue to the pattern within the pattern buffer at 920; compares the masked pattern buffer pattern to a pattern for the respective frame descriptor queue at 930; and sets a queue select flag for the respective frame descriptor queue if the masked pattern buffer pattern matches the frame descriptor queue pattern at 940. As illustrated in FIG. 2, the mask and pattern for each of the frame descriptor queues may be defined within the respective frame descriptor queue register 260. In the illustrated example, the queue selection component 240 is then arranged to determine whether a queue select flag for one of the non-default frame descriptor queues has been set, at 950. If a queue select flag has been set, the method ends at 970. However, if no queue select flag has been set for one of the non-default frame descriptor queues, the queue selection component 240 may be arranged to set a queue select flag for a default frame descriptor queue, at 960, before the method ends at 970. In this manner, the state machine is able to select a frame descriptor queue for the data frame descriptor based on a queue select flag that has been set by the queue selection component 240.

Figure 10:
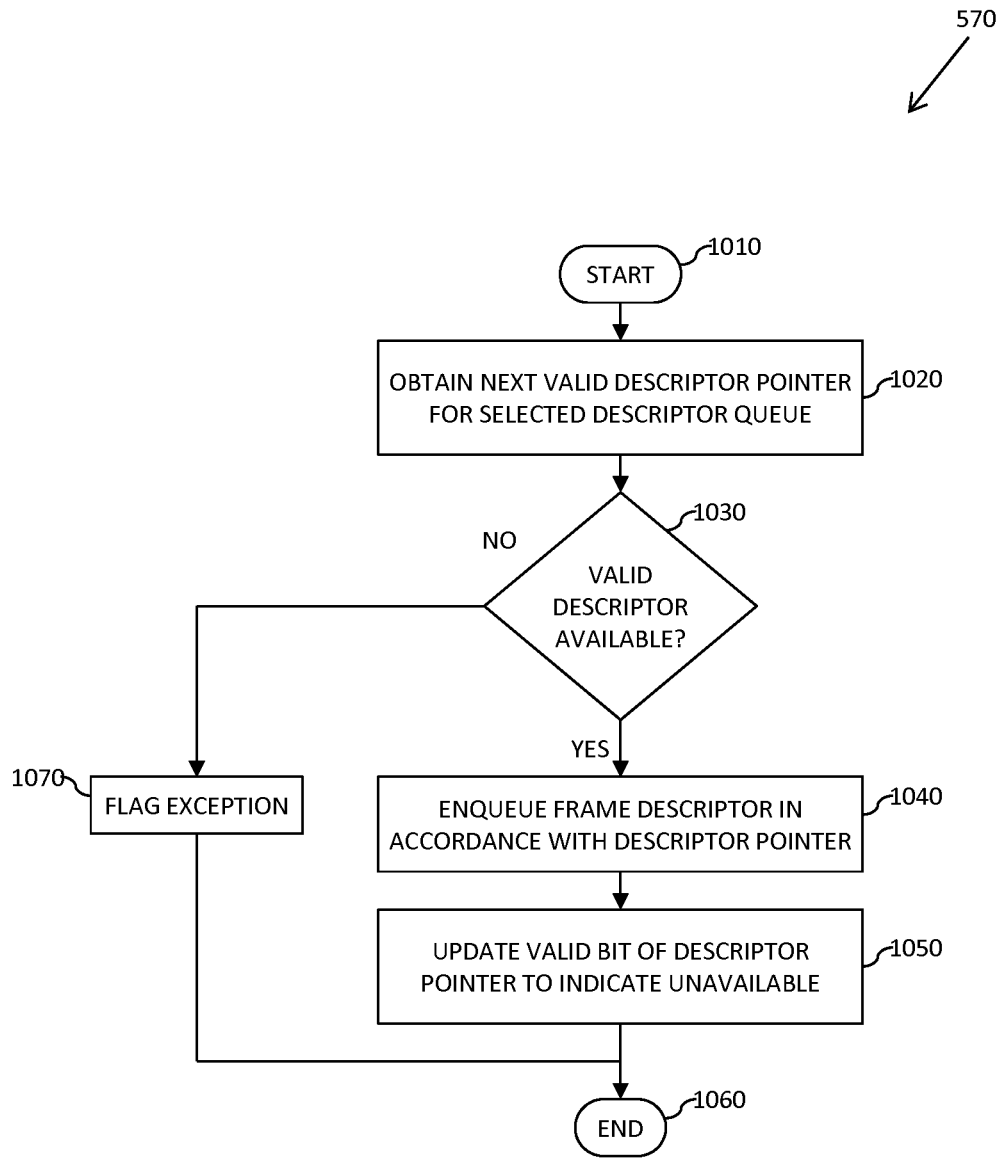
FIG. 10 illustrates a simplified flowchart of an example of adding a frame descriptor for a received data frame to a selected descriptor queue.

Referring back to FIG. 5, having selected the descriptor queue at 560, the method moves on to 570, where the frame descriptor for the received data frame is added to the selected descriptor queue. FIG. 10 illustrates a simplified flowchart of an example of adding the frame descriptor for the received data frame to the selected descriptor queue as may be performed at 570 in the method of FIG. 5. The method of FIG. 10 starts at 1010, and moves on to 1020 where the next valid descriptor pointer (e.g. the next descriptor pointer with a valid bit negated) is obtained, for example from the respective frame descriptor queue register 260. If no valid descriptor pointer is available, for example where all descriptor queues entries have valid bits set to indicate they are all unavailable, the method moves on to 1070 where an exception is flagged to the processing core(s) 110, and the method ends. If a valid descriptor pointer is available, the method moves on to 1040, where the frame descriptor generated by the state machine 210 is enqueued within the selected frame descriptor queue in accordance with the obtained descriptor point. The valid bit for the descriptor pointer is then updated (e.g. negated) to indicate the descriptor as no longer available at 1060, and the method ends at 1050

Referring back to FIG. 5, once the frame descriptor has been added to the selected frame descriptor queue at 650, the method moves on to 655 where it is determined whether the frame descriptor is for the last buffer pointer used for this data frame then the method. If it is determined that the frame descriptor is not for the last buffer pointer used for this data frame then the method loops back to 605. Else the method ends at 660.

Referring back to 635, if it is determined that the CRC was not successful, the method moves on to 645, where a default descriptor queue for failed CRC data frames is selected. Such a default queue for failed CRC data frames may be the same default queue selected when no pattern match is achieved for passed CRC data frames, as well as for dropped link frames, etc. The frame descriptor for the received data frame is then added to the selected (default) frame descriptor queue, at 650. Once again, the method then moves on to 655 where it is determined whether the frame descriptor is for the last buffer pointer used for this data frame then the method. If it is determined that the frame descriptor is not for the last buffer pointer used for this data frame then the method loops back to 605. Else the method ends at 660.

As previously mentioned, in the example herein before described with reference to the accompanying drawings, the DMA component 230 is able to begin writing the data frame being received to memory before the complete data frame has been received, thereby reducing the amount of local memory space (typically SRAM) required to be available within the FIFO buffers 235 for storing frame data. As a result, the amount of SRAM required to be provided within the network interface controller 140 may be reduced, thereby reducing the size and cost of the network interface controller 140, as well as reducing the power consumption due to less current leakage.

A further benefit provided by the example herein before described with reference to the accompanying drawings is that of reducing the processing overhead for the processing core(s) 110 due to the provision of a pool of buffer pointers defined within memory, and the network interface controller 140 being arranged to perform the action of identifying which buffer pointer in the pool of buffer pointers is the next available buffer pointer to be used and allocating the identified buffer pointer to a data frame being received. This allows the network interface controller 140 to manager the use of (defined) buffer pointers, thereby enabling a buffer pointer to be obtained earlier (e.g., without having to wait until the entire frame has been received), and freeing up software executing on the processing core(s) from having to perform this function.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A network interface controller comprising at least one controller component operably coupled to at least one memory element; the at least one controller component arranged to:
   identify a next available buffer pointer from a pool of buffer pointers based at least partly on availability check bits for buffer pointer entries within the pool of buffer pointers, wherein the pool of buffer pointers are stored within a first area of memory within the at least one memory element;
   load the identified next available buffer pointer into a buffer pointer register, wherein the buffer pointer register is a separate memory location the first area of memory that the pool of buffer pointers are stored;
   receive a start of a data frame via a network interface after the identified next available buffer pointer is loaded into the buffer pointer register; and
   allocate the identified next available buffer pointer to the data frame.

2. The network interface controller of claim 1, wherein the at least one controller component is arranged to:
   search buffer pointer entries within the pool of buffer pointers stored within the first area of memory for a buffer pointer entry comprising an availability check bit indicating the corresponding buffer pointer as being available; and
   identify as the next available buffer pointer a buffer pointer from a buffer pointer entry comprising an availability check bit indicating the corresponding buffer pointer as being available.

3. The network interface controller of claim 2, wherein the at least one controller component is arranged to update the availability check bit for the buffer pointer entry of the identified next available buffer pointer to indicate the corresponding buffer pointer as being unavailable, upon allocation of the identified next available buffer pointer to the data frame.

4. The network interface controller of claim 1, wherein the at least one controller component is arranged to identify a subsequent next available buffer pointer from the pool of buffer pointers upon allocation of the present identified next available buffer pointer to the data frame.

5. The network interface controller of claim 1, wherein the buffer pointer register is arranged to further have stored therein an indication of a size of the pool of buffer pointers.

6. The network interface controller of claim 5, wherein the buffer pointer register is arranged to further have stored therein an indication of a location of the pool of buffer pointers within the first area of memory.

7. The network interface controller of claim 1, wherein the at least one controller component is further arranged to:
   generate a frame descriptor for the data frame being received, the frame descriptor comprising at least the identified next available buffer pointer allocated to the data frame; and
   enqueue the frame descriptor within a frame descriptor queue within a second area of memory of the at least one memory element.

8. The network interface controller of claim 1, wherein the network interface comprises at least one queue selection component arranged to select a frame descriptor queue within which to enqueue the frame descriptor for the data frame being received from a plurality of frame descriptor queues.

9. The network interface controller of claim 8, wherein the at least one queue selection component is arranged to compare a pattern for the data frame being received to a pattern for each of at least a sub-set of the plurality of frame descriptor queues, and to select a frame descriptor queue within which to enqueue the frame descriptor for the data frame being received based at least partly on said comparison.

10. The network interface controller of claim 9, wherein the network interface controller comprises a descriptor queue register corresponding to each of at least the sub-set of the plurality of frame descriptor queues, each descriptor queue register having stored therein at least the pattern for the respective frame descriptor queue.

11. The network interface controller of claim 10, wherein each descriptor queue register further has stored therein a descriptor queue pointer for the respective frame descriptor queue, and the at least one controller component is arranged to enqueue the frame descriptor within the selected frame descriptor queue in accordance with the descriptor queue pointer stored within the descriptor queue register corresponding to the selected frame descriptor queue.

12. The network interface controller of claim 11, wherein the at least one controller component is arranged to update the descriptor queue pointer stored within the descriptor queue register corresponding to the selected frame descriptor queue upon the frame descriptor for the data frame being enqueued therein.

13. The network interface controller of claim 12, wherein each descriptor queue register is arranged to further have stored therein an indication of a size of the frame descriptor queue.

14. The network interface controller of claim 13, wherein each descriptor queue register is arranged to further have stored therein an indication of a location of the frame descriptor queue within the second area of memory.

15. The network interface controller of claim 7, wherein the at least one controller component is arranged to generate the frame descriptor for the data frame being received, the frame descriptor further comprising at least one of:
 a timestamp value corresponding to the receipt of the start of the data frame being received;
 a byte count for the data frame being received;
 a flag indicating this is the last frame descriptor linked to a received frame; and
 a cyclic redundancy check result for the data frame being received.

16. The network interface controller of claim 1 implemented within an integrated circuit device comprising at least one die within a single integrated circuit package.

17. A signal processing system comprising a network interface controller, the network interface controller comprising at least one controller component operably coupled to at least one memory element; the at least one controller component arranged to:
 identify a next available buffer pointer from a pool of buffer pointers based at least partly on availability check bits for buffer pointer entries within the pool of buffer pointers, wherein the pool of buffer pointers are stored within a first area of memory within the at least one memory element, wherein the pool of buffer pointers is a single pool of buffer pointers associated with a plurality of frame descriptor queues;
 receive a start of a data frame via a network interface; and
 allocate the identified next available buffer pointer to the data frame.

18. A method of handling incoming data frames within a network interface controller, the method comprising, within a controller component of the network interface controller:
 identifying a next available buffer pointer from a pool of buffer pointers based at least partly on availability check bits for buffer pointer entries within the pool of buffer pointers, wherein the pool of buffer pointers are stored within a first area of memory within at least one memory element operably coupled to the network interface controller, wherein the pool of buffer pointers is a single pool of buffer pointers associated with a plurality of frame descriptor queues;
 receiving a start of a data frame via a network interface; and
 allocating the identified next available buffer pointer to the data frame.

* * * * *